United States Patent
Ho et al.

(10) Patent No.: US 10,942,565 B2
(45) Date of Patent: Mar. 9, 2021

(54) VIRTUAL REALITY ADAPTIVE DISPLAY CONTROL

(71) Applicant: Intel Corporation, Santa Clara, CA (US)

(72) Inventors: Ying Ern Ho, Bayan Lepas (MY); Wooi Jou Tan, Bayan Lepas (MY); Natasya Athirah Abdul Khalid, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/222,363

(22) Filed: Dec. 17, 2018

(65) Prior Publication Data

US 2019/0265785 A1   Aug. 29, 2019

(51) Int. Cl.
*G06F 3/01* (2006.01)
*G09G 5/02* (2006.01)
*G09G 5/10* (2006.01)

(52) U.S. Cl.
CPC .............. *G06F 3/013* (2013.01); *G09G 5/02* (2013.01); *G09G 5/10* (2013.01); *G09G 2354/00* (2013.01)

(58) Field of Classification Search
CPC . G06F 3/013; G06F 3/147; G09G 2320/0626; G09G 2320/0666; G09G 2320/0693; G09G 2354/00; G09G 3/20; G09G 5/02; G09G 5/10
See application file for complete search history.

(56) References Cited

U.S. PATENT DOCUMENTS

| | | | |
|---|---|---|---|
| 2003/0086057 A1* | 5/2003 | Cleveland | A61B 3/113 351/204 |
| 2010/0010370 A1* | 1/2010 | De Lemos | A61B 3/112 600/558 |
| 2011/0080421 A1* | 4/2011 | Capener | G09G 5/10 345/589 |
| 2013/0113973 A1 | 5/2013 | Miao | |
| 2015/0061990 A1* | 3/2015 | Toner | A61B 3/10 345/156 |
| 2016/0034032 A1* | 2/2016 | Jeong | G06F 3/013 345/156 |
| 2016/0231573 A1* | 8/2016 | Mullins | G02B 27/017 |

(Continued)

OTHER PUBLICATIONS

Beukema et al., "Pupil Dilation to Illusory Motion in Peripheral Drift Images: Perception Versus Reality," Journal of Vision, vol. 17, No. 8, 2017, 13 pages.

*Primary Examiner* — Hong Zhou
(74) *Attorney, Agent, or Firm* — Hanley, Flight & Zimmerman, LLC

(57) ABSTRACT

Apparatus, systems, articles of manufacture, and methods for adaptive display control in virtual reality environments are disclosed. An example virtual reality display device for adaptive display control in a virtual reality environment includes a scanner to detect a first size of a pupil of an eye of a user. The device also includes an analyzer to determine a first characteristic of a display image, reference a second pupil size based on the first characteristic of the display image, compare the first pupil size and the second pupil size, and adjust a second characteristic of the display image when the second pupil size is different than the first pupil size. The device also includes a display screen to present the second characteristic.

25 Claims, 5 Drawing Sheets

(56) References Cited

U.S. PATENT DOCUMENTS

2017/0277258 A1* 9/2017 Ma .......................... G06F 3/013
2017/0365101 A1* 12/2017 Samec ................. G06T 19/006
2018/0286070 A1* 10/2018 Benedetto ................ G06T 7/62
2018/0365875 A1* 12/2018 Yildiz ..................... G06F 3/013

* cited by examiner

VIRTUAL REALITY ADAPTIVE DISPLAY CONTROL

FIELD OF THE DISCLOSURE

This disclosure relates generally to virtual reality displays, and, more particularly, to systems, apparatus, and methods for virtual reality adaptive display control.

BACKGROUND

In virtual reality, head-mounted displays are intended to provide full immersive virtual reality experience to the user that enables a realistic three-dimensional experience. Some virtual reality systems do not provide for adjustment of display brightness and other characteristics.

BRIEF DESCRIPTION OF THE DRAWINGS

The figures are not to scale. Also, in general, the same reference numbers will be used throughout the drawing(s) and accompanying written description to refer to the same or like parts.

DETAILED DESCRIPTION

Figure 1:
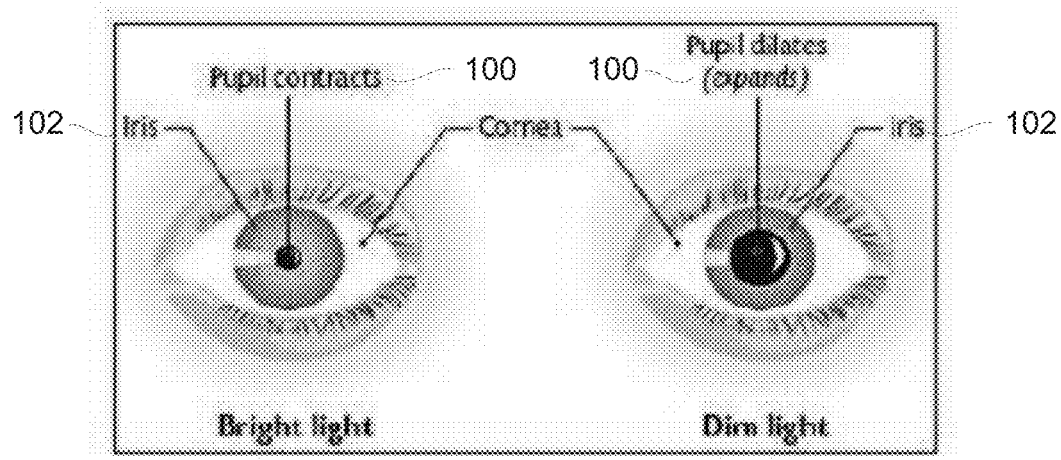
FIG. 1 is an illustration of pupil response to brightness.

Virtual Reality (VR) head-mounted displays (HMDs) allow users to experience, and interact with, a computer-generated world where digital three-dimensional alternatives replace natural sensory perceptions. HMDs have evolved to provide an increased field of view, high-resolution images, lightweight design, and pricing that are appealing to consumers. HMDs may be coupled to a user's personal computer or other source of video output through a wired connection or through wireless technology such as Wireless Gigabit Alliance (WiGig). The HMD positions the display in front of the user's eyes, and is therefore worn on the head or built into a helmet, a mask, and/or goggles. VR HMDs have applications in entertainment such as, for example, gaming and are also found in real-world applications, including, for example, military training, the treatment and assessment of health care issues, as well as exploration, scientific research, and training simulation needs.

As used herein, the term "user" can refer to a gamer, a subject, a patient, a participant, and/or other person who uses the devices disclosed herein to experience a virtual reality environment. In addition, the terms "virtual reality" and "virtual reality environment" are used interchangeably throughout this disclosure. Also, the terms "video," "streaming video," "video data," and "stream of video data" are used interchangeably throughout this disclosure.

While HMDs have evolved to provide more user features, some display characteristics have remained static and could not be modified by the user based on individual preference. For example, in some HMDs, display brightness adjustment options are not provided, which reduces the quality of the user experience because the user may experience eye straining induced by prolonged periods of very close viewing distances with an HMD. Also, some HMDs provide the ability to adjust display brightness manually. However, in these examples, the display brightness remains static between manual adjustments and is not adaptive to a dynamic presentation such as, for example, the changing presentations in a gaming context. In addition, manual adjustment of brightness is inconvenient and causes the user to interact with the real world, outside of the VR environment. Pulling the user from the VR environment defeats the aim of providing an entirely immersive and realistic experience to the user.

Examples disclosed herein include adaptive control that allows for a more individualized user experience through the optimization of user-controlled settings based on a desired level of control system performance. An adaptive display control is able to adjust display characteristics repeatedly and improve the output quality of visual media and the experience. For example, adapting brightness and contrast based on user feedback increases VR comfort. Improvement in the control of HMD characteristics that affect the user experience and comfort, such as display brightness, enhances user experience and provides relief from straining resulting from a lack of dynamic adaptation to user needs. Furthermore, adaptive control of display characteristics can simplify the Human Machine Interface (HMI). For example, adaptive display brightness simplifies the VR configuration process and minimizes distraction in VR environment exploration. Automatic adaptive control further realizes these advantages.

In some examples, display characteristic control may be attained based on pupil size feedback. In such examples, the VR experience becomes more immersive and realistic because the characteristics of the display are automatically adapted (e.g., without user manual adjustment) based on physiological changes experienced by the user—in this example, pupil size changes. Also, in such examples, there is a reduction or elimination in eye strain allowing users to use VR HMDs for longer periods of time. Furthermore, adaptive display brightness minimizes power consumption, thereby having power saving effects that also can prolong the system use.

Disclosed herein are systems, apparatus, methods, and articles of manufacture for adaptive display control in a VR environment. Display control that is adaptive to the user provides a full immersive VR experience. In some examples, the user's physiological response to the VR environment, where the user unintentionally and/or passively provides feedback to the system, is tracked. The user's physiological response may be tracked periodically, aperiodically, intermittently, randomly, constantly, in real-time, in near-real time, and/or on any other suitable basis. In some examples, the size of the pupil is assessed in order to determine whether the video display is too bright or dim for user preference and/or based on a reference standard or recommended brightness. The examples disclosed herein readily obtain pupil size information because there is direct access to the user's visual field through the HMD.

In some examples, pupil dilation or constriction can also be determinant factors of user response to not only light level, but also illusory motion, isoluminant color exchange, and/or overall variations in the spatial and/or temporal characteristics of stimuli. Pupil response to luminance changes is bidirectional (e.g., increase in total luminance results in pupil constriction while a decrease in total luminance results in pupil dilation). In addition, pupil responses to isoluminant color exchanges are independent of exchange directions (e.g., pupil constrictions occur whether isoluminant red/green color exchanges use green stimuli on red backgrounds or red stimuli on green backgrounds).

In some examples, the adaptive display control can be used in combination with a physical touchpad or game controller. In some examples, the adaptive display may be used in both wired and wireless HMDs. Further, in some examples a pupil scanner may be placed on an HMD to determine the location of user's eye iris and pupil, adjusting the display brightness accordingly after measuring the size of the pupil. In some examples, the pupil scanner may be used to adaptively control other display characteristics, such as, for example, display motion and/or color. In some examples, the display brightness will be increased if the pupil size is increased and decreased if the pupil size is decreased.

FIG. 1 shows an illustration of the pupillary light reflex (PLR), or the constriction and dilation of the pupil in response to light. While factors affecting average pupil diameter include age, iris color, and/or retinal nerve health, ambient light level is the most powerful determinant of pupil size. As shown in FIG. 1, the pupil 100 contracts in bright light, which decreases the diameter of the pupil 100 and increases the size of the iris 102. In addition, the pupil 100 dilates or expands in dim light, which increases the diameter of the pupil 100 and decreases the size of the iris 102.

Figure 2:
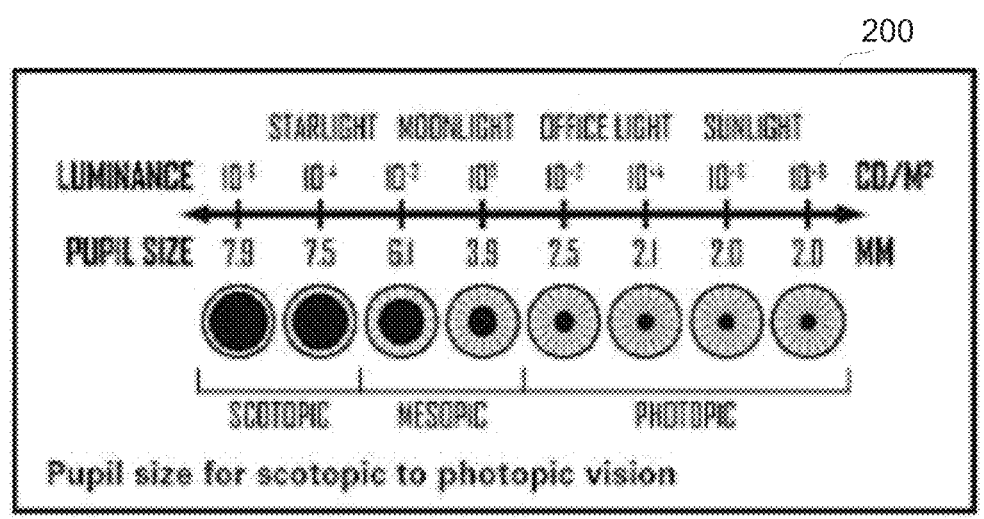
FIG. 2 is an illustration of an example of pupil size variation in response to brightness.

FIG. 2 shows another illustration of pupil size variation in response to brightness. FIG. 2 correlates pupil size with luminance in the example scale 200. At one end of the example scale 200, the light environment is very dim such as, for example, under starlight. At this end, the luminance is on the order of about $10^{-6}$ candela per square meter ($cd/m^2$) to about $10^{-4}$ $cd/m^2$. The pupil diameter ranges from about 7.5 millimeters (mm) to about 7.9 mm or 8 mm at full dilation (mydriasis). The example scale 200 also includes a range under relatively brighter conditions including, for example, conditions under moonlight, in which the luminance is on the order of about $10^{-2}$ $cd/m^2$ to about 1 $cd/m^2$, and the pupil diameter ranges from about 6.1 mm to about 3.9 mm. The example scale 200 also includes a range under still relatively brighter conditions including, for example, conditions experienced in an office under artificial light, in which the luminance is on the order of about $10^2$ $cd/m^2$ to about $10^4$ $cd/m^2$, and the pupil diameter ranges from about 2.5 mm to about 2.1 mm. The example scale 200 also includes a range under bright conditions including, for example, conditions under sunlight, in which the luminance is on the order of about $10^6$ $cd/m^2$ to about $10^8$ $cd/m^2$, and the pupil ranges from about 1.5 mm to about 2 mm in diameter during excessive constriction (miosis).

The changes in size of the pupil occur due to antagonistic interactions between the iris sphincter and dilator muscles. At the onset of a light stimulus, there is a delay in pupil constriction (response latency) due to iris smooth muscle contraction delay, lasting around about 180 milliseconds (ms) to about 230 ms. The latency shortens with increasing light intensity. The retina includes photoreceptor cells (e.g., rods and cones) that convert light into electrical impulses. The rods are more sensitive to movement/motion and less sensitive to color perception. The rods enhance scotopic vision (eyesight at low light conditions). Inversely, the cones provide visual acuity and color vision, function well in bright light, and are not sensitive to lower luminance levels. The cones enhance photopic vision (eyesight in daylight conditions).

Figure 3:
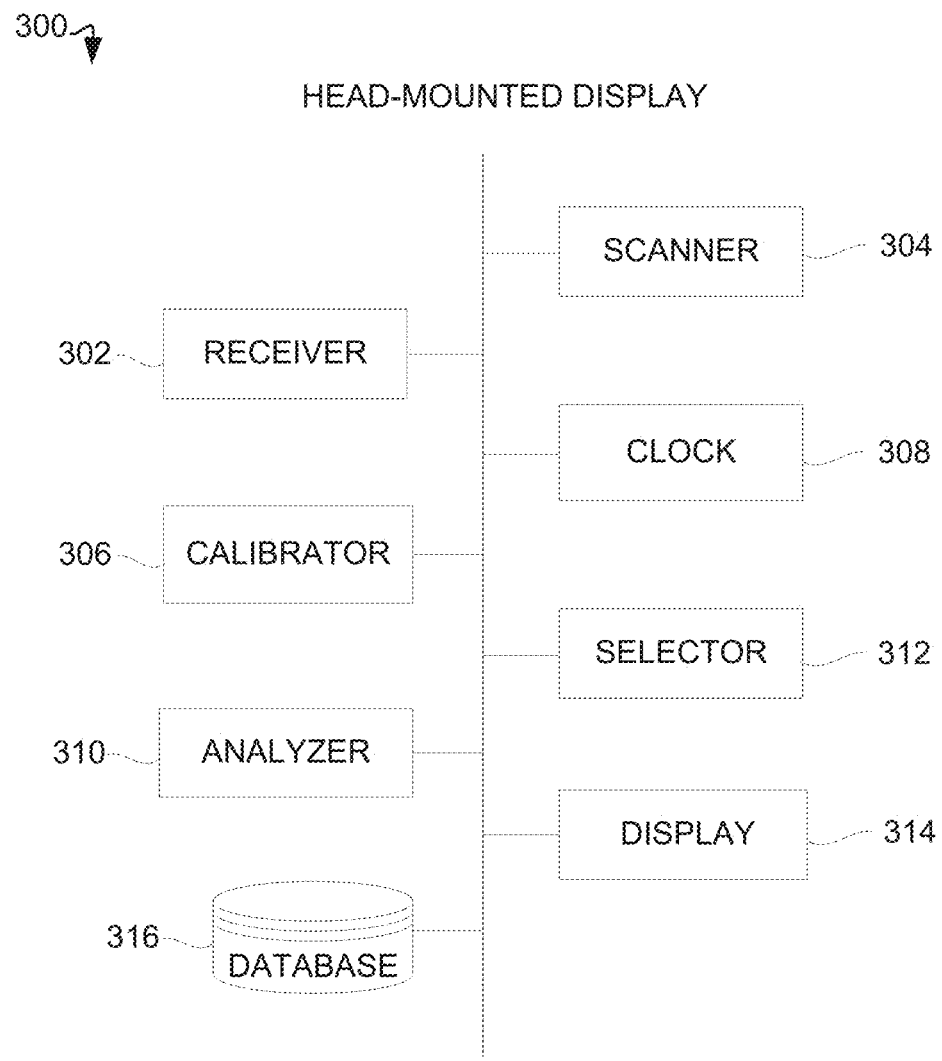
FIG. 3 is a block diagram of an example system for an example head-mounted display for use in a virtual reality environment in accordance with teachings of this disclosure.

FIG. 3 is a block diagram of an example head-mounted display (HMD) 300 for processing eye pupil-derived information in a VR environment in accordance with the teachings of this disclosure. The example HMD 300 includes an example receiver 302, an example scanner 304, an example calibrator 306, an example clock 308, an example selector 312, an example analyzer 310, an example display 314, and an example database 316. An immersive VR environment is created by the display 314 projecting updated computer-based generation images based on user movements to the user wearing the HMD 300.

The HMD 300 receives a stream of video data at the example receiver 302. The receiver 302 receives wireless communication including, for example, VR video data including the stream of video data over a wireless or wired link from, for example, a host device. In some examples, the receiver 302 may be separate from the HMD 300. In such examples, the components to make the HMD 300 wireless will be an add-on kit separate from the HMD 300. In other examples, the receiver 302 is directly integrated into the HMD 300. The stream of video data is presented to the user via the display 314 as noted above.

The eye scanner 304 detects the location of the user's eye, iris, and pupil. Pupil size depends on factors such as, for example, age, iris color, and environmental or display brightness. The scanner 304 detects the size over time. In some examples, size data is stored in the database 316. The size data can be stored in the database 316 with data corresponding to a color displayed, a portion of the video displayed, a time of scan, etc. In some examples, the scanner 304 implements the means for detecting. The means for detecting may be implemented by a processor such as the processor of FIG. 5 executing instructions such as the instructions of FIG. 4.

The HMD 300 includes a calibrator 306 to enable the user to perform a calibration for customization to the user's physical characteristics. In some examples, the calibrator 306 performs the calibration process after the clock 308 has determined that a pre-determined amount of time has passed since the user started wearing and/or powered on the HMD 300. The delay prior to the onset of the calibration processes allows the user to adapt to the HMD display environment. For example, if the user has returned from a very dark or glaring environment, the user's eyes will take some time to adjust to the environment presented in the HMD 300. The delay prior to the calibration process prevents the previous environmental conditions from adversely affecting the calibration reading with data gathered from the scanner 304 while the eyes adjust. In some examples, the time interval setting used by the clock 308 may be determined by the user. Also, in some examples, the user may delay calibration without relying on the clock 308. For example, the user may manually start the calibration process by initiating the calibrator 306 when the user feels they are adapted to the HMD environment.

In some examples, in order to match user eye pupil size to a plurality of colors, the calibrator 306 completes the calibration process after the plurality of colors have been iterated through completely. During the calibration process, a single color is first displayed. In this example, the color is displayed across the entire field of view on the display 314 in the HMD 300. For example, the calibrator 306 can start the calibration with the color of RGB_cal [1] (e.g., white) shown across the display 314. In some examples, the color is shown with the user preferred brightness set using selector 312. The user's eye pupil size is scanned by the scanner 304 and recorded for that color by calibrator 306 in the database

316. In some examples, the pupils are scanned individually and independently to gather separate data and maintain separate records of the pupil size for both eyes.

An iteration is performed by the calibrator 306 through a set of predefined colors, which are shown on the display 314 one by one for calibration. In other words, during calibration colors are displayed independently and in sequence. For example, after the display of a first calibration color such as, for example, RGB_cal [1], the calibrator 306 may next cause the display 314 to display a second calibration color such as, for example, the color RGB_cal [2] (e.g., blue) across the display 314. The color may be shown with the user preferred brightness set using selector 312. The user's eye pupil size is scanned by the scanner 304 and recorded for this color by calibrator 306 in the database 316. In some examples, the calibrator 306 sets the recorded pupil size for each color as a threshold for the corresponding color.

The calibrator 306 may continue the calibration process by repeating the process through several rounds until multiple colors and/or all colors for calibration are displayed and respective pupil size reference are recorded in the database 316. The colors used for calibration could be predefined colors including, for example, primary colors, primary colors and white and black, combinations of colors in an RGB color model, and/or other desired sets of colors. In some examples, the calibrator 306 completes the calibration after calibrating both eye pupils. In some examples, the calibrator 306 implements the means for performing a calibration. The means for performing a calibration may be implemented by a processor such as the processor of FIG. 5 executing instructions such as the instructions of FIG. 4.

The selector 312 is used to select the preferred or a selected user setting. For example, the preferred user display parameter settings may be stored in the database 316. For example, the display parameter may include display brightness. Preferred or otherwise selected user display brightness may include a dimmer or brighter setting from a default setting. For example, the user may prefer a lower value on the brightness scale which makes the display dimmer than an original setting of the HMD 300 such as, for example, a setting programmed into the HMD by the manufacturer. In some examples, the user can update the preferred settings based on, for example, change in user physiology, time of day, user mood, etc. In some examples, the selector 312 implements the means for receiving a display image parameter. The means for receiving a display image parameter may be implemented by a processor such as the processor of FIG. 5 executing instructions such as the instructions of FIG. 4.

The analyzer 310 accesses data stored in the database 316 related to pupil size data generated or gathered by the scanner 304, time data from the clock 308, calibration data generated or stored by the calibrator 306, etc. The analyzer 310 also assesses the colors shown on the display 314 during use of the HMD 300. For example, the analyzer 310 determines if the overall color of the display 314 approximates, is substantially similar to, and/or equal to one of the RGB colors used by the calibrator 306 during calibration. In some examples, the analyzer 310 does not need to find an RGB color used by the calibrator 306 that is exactly identical to the overall color of the display 314. In some examples disclosed herein, a threshold or margin of similarity between the RGB color used by the calibrator 306 and the overall color of the display 314 may be used during the analysis and operation of the HMD 300.

The analyzer 310 identifies how and when the user eye pupil size changes over time and/or in response to changes in displays during HMD use. If the analyzer 310 detects a change in the eye pupil size, the analyzer 310 determines the overall color of the display 314. The analyzer 310 initiates a comparison of the eye pupil size to calibrated or referenced eye pupil sizes established during the calibration process by the calibrator 306. The analyzer 310 analyzes the pupil size in view of the color shown on the display 314, that is the overall color.

In some examples, there are multiple colors shown on the display. For example, video has many colors shown simultaneously on a display. The analyzer 310 determines the overall or main color components in the display. The overall color may be known as the main color, the dominant color, or for example, an RGB_Overall color. The overall color is used by the analyzer 310 to identify the relevant calibration data for comparison, as disclosed above. That is, the analyzer 310 identifies the overall color on the display 314 to determine a suitable threshold. For example, if the screen is displaying a multitude of colors but the overall color displayed is white, the reference level according to the calibration pupil size measurements identified for the white color will be used.

With the relevant calibration data identified, the analyzer 310 analyzes the pupil size in view of the overall color shown on the display. If the pupil size is greater than an assigned reference pupil size for that color, the display brightness is increased to induce the pupil to decrease in size to align the pupil size with the expected pupil size determined by the calibrator 306. If the pupil size is smaller than the assigned reference pupil size for that color, the display brightness is decreased to induce the pupil to increase in size to align the pupil size with the expected pupil size determined by the calibrator 306.

For example, if the overall display color is red, the analyzer 310 compares the detected or scanned pupil size to the pupil size stored in the database 316 that is calibrated at the reference point for the color red. If the analyzer 310 determines that the pupil size detected by the analyzer 310 is different from the calibrated size, the analyzer 310 will cause the display brightness to change. For example, if the detected pupil size is smaller than the calibration size by, for example, the threshold margin ±z %, the analyzer 310 causes the display brightness to decrease to allow the pupil to increase in size, thereby removing the ±z % difference from the calibrated or reference point. Therefore, the analyzer 310 automatically initiates adjustments to display characteristics based on corresponding physiological changes to a user's eyes. In some examples, the analyzer implements the means for analyzing. The means for analyzing may be implemented by a processor such as the processor of FIG. 5 executing instructions such as the instructions of FIG. 4.

The display 314 outputs the adjustments made by the analyzer 310 of the HMD 300. In some examples, an increase in pupil size will result in an increase in display 314 brightness, while a decrease in pupil size will result in a decrease in display 314 brightness. Thus, in some examples, divergences in the pupil size from the calibration or reference pupil size results in adjustments to characteristics of the display 314, such as, for example, brightness. Additionally or alternatively, in other examples, the display 314 characteristic changes include changes in motion and/or color. In some examples, the display 314 implements the means for presenting. The means for presenting may be implemented by a processor such as the processor of FIG. 5 executing instructions such as the instructions of FIG. 4.

Video typically includes repeatedly changing images on a display. Thus, color, brightness, and/or motion changes in a video can cause changes to the size of a pupil. The elements of the HMD 300 operate continuously or otherwise over time to continue to assess pupil size and adjust display characteristics as the video progresses. In some examples, if no changes in eye pupil size are identified, the analyzer 310 does not initiate any changes in display 314 characteristics.

While an example manner of implementing the HMD 300 for adaptive display control in VR environments is illustrated in FIG. 3, one or more of the elements, processes and/or devices illustrated in FIG. 3 may be combined, divided, re-arranged, omitted, eliminated and/or implemented in any other way. Further, the example receiver 302, the example scanner 304, the example calibrator 306, the example clock 308, the example analyzer 310, the example selector 312, the example display 314, the example database 316, and/or, more generally, the example HMD 300 of FIG. 3 may be implemented by hardware, software, firmware and/or any combination of hardware, software and/or firmware. Thus, for example, any of the example receiver 302, the example scanner 304, the example calibrator 306, the example clock 308, the example analyzer 310, the example selector 312, the example display 314, the example database 316, and/or, more generally, the example HMD 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver 302, the example scanner 304, the example calibrator 306, the example clock 308, the example analyzer 310, the example selector 312, the example display 314, and/or the example database 316 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system 300 for preventing motion sickness in virtual reality environments of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
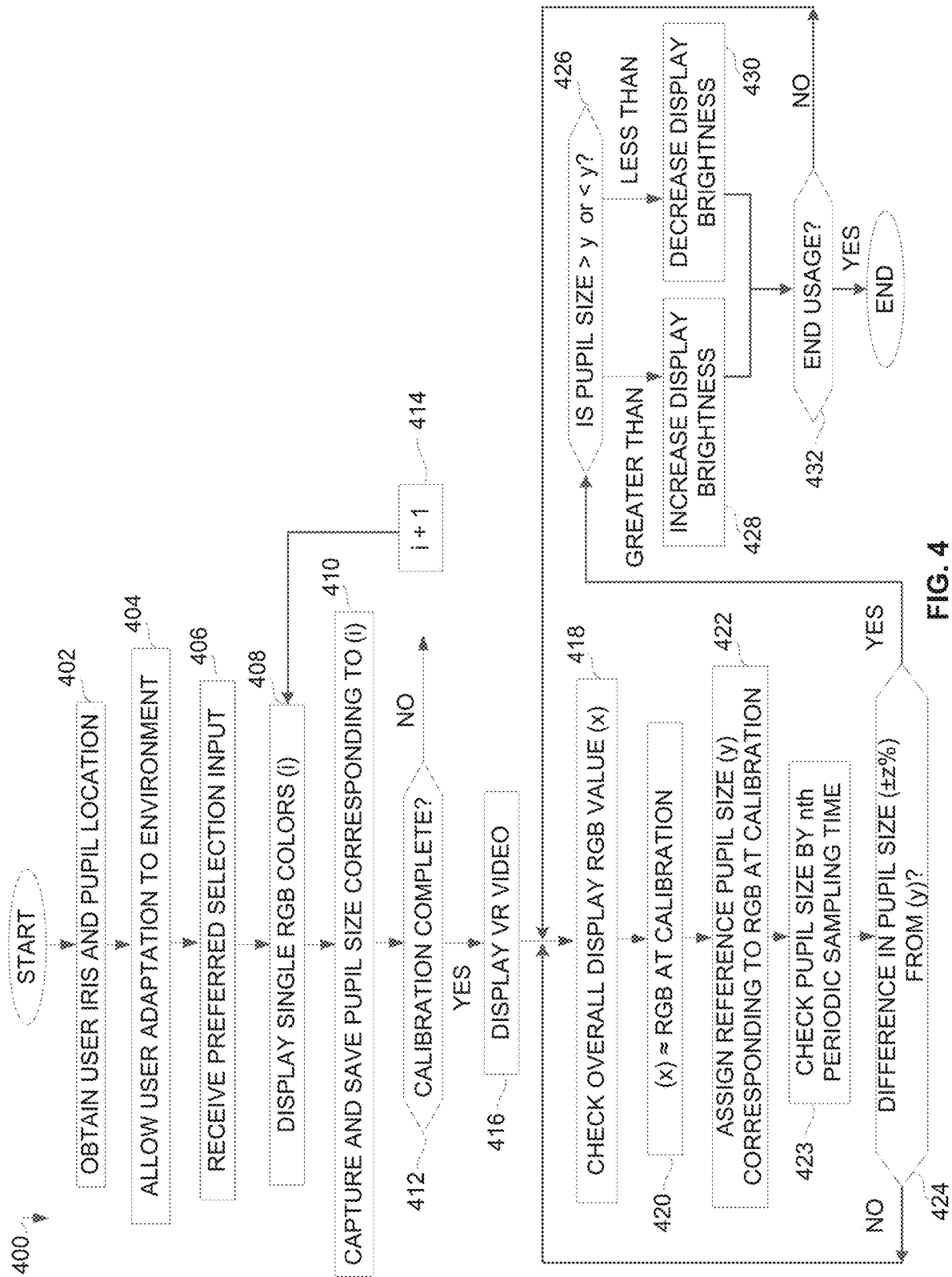
FIG. 4 is a flowchart representative of machine readable instructions which may be executed to implement elements of the example head-mounted display of FIG. 3.

A flowchart representative of example hardware logic, machine readable instructions, hardware implemented state machines, and/or any combination thereof for implementing the HMD 300 of FIG. 3 is shown in FIG. 4. The machine readable instructions may be an executable program or portion of an executable program for execution by a computer processor such as the processor 506 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 506, but the entire program and/or parts thereof could alternatively be executed by a device other than the processor 506 and/or embodied in firmware or dedicated hardware. Further, although the example program is described with reference to the flowchart illustrated in FIG. 4, many other methods of implementing the example apparatus 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 is a flowchart of example machine readable instructions of an example program that may be executed to implement elements of the HMD 300 of FIG. 3 for adaptive control of a display to alter display characteristics such as, for example, brightness based on user pupil size. In the example program, the eye scanner 304 obtains the location of user's iris and eye pupil (block 402), which will be used to assess the size of the pupil. Size of pupil depends on factors such as, for example, age and/or iris color. To account for idiosyncrasies among users, the calibrator 306 performs a calibration process. In some examples, the calibrator 306 performs the calibration process for all first time users. The calibrator 306 specifically and the HMD 300, in general, allow user adaptation to the environment (block 404) by waiting for a period of time before continuing the example program of FIG. 4. In some examples, the clock 308 detects the passage of the period of time. The delay is to allow the user to adapt to the HMD display environment because the user's prior environment impacts the size of the user's pupils. For example, if the user was previously in a very dark environment, the user's pupil size will be large. Likewise, if the user was previously in a glaring environment, the user's pupil size will be small. The disparity or an extreme measurement may affect the calibration process.

The selector 312 receives the preferred or selected user parameter selection input (block 406). For example, the preferred user display brightness setting may include a dimmer or brighter setting from the default setting. For example, if the user prefers a setting which is dimmer than a default and/or original setting of the HMD 300 set by the manufacturer, the user can adjust this setting to correspond to the user's preference. The calibrator 306 therefore initiates the display of RGB colors at the brightness setting preference selected by the user. For example, if the user indicated their preference for dimmer display brightness than originally set by default, the color display would occur at the preferred dimmer setting rather than the default setting.

The calibrator 306 identifies how the user eye pupil size changes according to display color by checking through a set of colors including, for example, predefined RGB colors (block 408). In some examples, the calibrator 306 initiates the displaying of a single RGB color (i) at a time (block 408) and recording the size of eye pupil in the database 316 (block 410). In such examples, the single RGB color (i) is presented across the entire display 314. The data set of color correlated with pupil size serves as the calibration/reference or threshold to determine the user physiological responses for particular color content.

The calibrator 306 determines if the calibration process is complete (block 412). For example, the calibrator 306 determines is all of the colors to be used to establish the calibration data has been tested for the user, and, if the not, the calibration process is not complete (block 412). The example program increments the color (i+1) (block 414) by selecting another color in the set of color to test or calibrate. The calibrator 306 displays the color (i+1) (block 408). The calibrator 306 continues with capturing the pupil size (block 410) during the display of the color (i+1), and determining if the calibration process is complete (block 412).

In some examples, the calibrator 306 finishes the calibration process when all of a set of predefined colors that are to be matched to a pupil size have been tested against or calibrated with a pupil size. If the calibrator 306 determines that the calibration is complete (block 412), the HMD 300 proceeds with presentation of VR video (block 416). The calibration process enables the HMD 300 to operate with display of the video while dynamically adapting characteristics of the display in accordance with data gathered in the calibration process as disclosed herein.

The display 314 outputs the VR video (block 416) to provide the user with the VR experience. While the user is exploring the VR environment, the video changes and, therefore, the color of the display 314 of the HMD 300 also changes. The analyzer 310 determines or checks the overall color content or dominant color of the display, and the scanner 304 detects user pupil size (block 418). In some examples, the overall color is represented by an RGB value (x). The analyzer 310 uses the overall color to determine the eye pupil size to be used as a reference and for the threshold comparison.

The analyzer 310 approximates the RGB (i) colors used by the calibrator 306 during calibration for the overall color (x) of the display (block 420). That is, the analyzer 310 determines the RGB (i) color used by the calibrator 306 during calibration that is substantially similar to or equal to the overall color (x) of the display (block 420). When the calibration RGB (i) color that approximates the overall color (x) is identified (block 420), the analyzer 310 assigns the pupil size correlated to that RGB (i) color in calibration as the reference pupil size (y) (block 422). For example, if the display overall color content is red (block 420), the corresponding eye pupil size for red color display recorded from the calibration process will be served as the reference pupil size (y) (block 422).

The analyzer 310 checks the user eye pupil size continually or otherwise repeatedly by checking in terms of nth periodic sampling time (block 423) to allow the pupil to adapt to small changes in video or other visual stimulus. For example, the range in nth periodic sampling time may be 180 ms to 230 ms, which is the delay in pupil constriction (response latency) due to iris smooth muscle contraction delay in response to the onset of a light stimulus, with the latency becoming shorter with increasing light intensity. The analyzer 310 checks the pupil size in accordance with the nth periodic sampling so the pupil has time to adjust to changes made to the display and so the system does not overcompensate with unnecessary changes while the pupil is adjusting.

The analyzer 310 determines if there is a difference in pupil size between the pupil size detected by the scanner 304 (block 418) and the reference pupil size (y) (block 424). In some examples, the change detection by the analyzer 310 may be based on exceeding, meeting, or satisfying a threshold so relatively small changes or fluctuations in pupil size do not affect display characteristics. In other examples, relatively small changes or fluctuations in pupil size are intended to change display characteristics. In addition, in some examples, the analyzer 310 checks pupil size continuously, periodically, aperiodically, randomly, and/or at other suitable or desired intervals and/or times to make sure the display characteristics such as, for example, brightness are optimal. If the analyzer 310 does not determine that there is a difference in pupil size between the pupil size detected by the scanner 304 and the reference pupil size (y) (block 424), the example program continues with the analyzer 310 continuing to check the overall color content of the display, and the scanner 304 detects user pupil size (block 418).

If the analyzer 310 does determine that there is a difference in pupil size between the pupil size detected by the scanner 304 and the reference pupil size (y) (block 424), the analyzer 310 determines if the difference between the detected pupil size and the reference pupil size (y) indicates that the detected pupil size is greater than the reference pupil size (y) or if the detected pupil size is less than the reference pupil size (y) (block 426). If the analyzer 310 determines that the detected pupil size is greater than the reference pupil size (y) (block 426), the display brightness is adjusted accordingly, and, in this example, the display brightness is increased (block 428). For example, if the detected pupil size is greater than the calibration size or reference pupil size (y) by, for example, the threshold margin ±z %, the analyzer 310 causes the display brightness to increase to allow the pupil to decrease in size, thereby removing the z % difference between the detected pupil size and the reference pupil size (y). If the analyzer 310 determines that the detected pupil size is less than the reference pupil size (y) (block 426), the display brightness is adjusted accordingly, and, in this example, the display brightness is decreased (block 430). For example, if the detected pupil size is smaller than the calibration size or reference pupil size (y) by, for example, ±z %, the analyzer 310 causes the display brightness to decrease to allow the pupil to increase in size, thereby removing the z % difference between the detected pupil size and the reference pupil size (y). In other examples, display characteristics other than brightness are adjusted, including, for example color and/or motion.

The HMD 300 determines if usage of the device continues or has ended (block 432). If usage has not ended (block 432), the analyzer 310 continues to check the overall color content of the display, and the scanner 304 detects user pupil size (block 418), and the example program continues to adaptively alter display characteristics based on changes in the users pupil size as disclosed above. If usage has ended (block 432), the example program ends.

Figure 5:
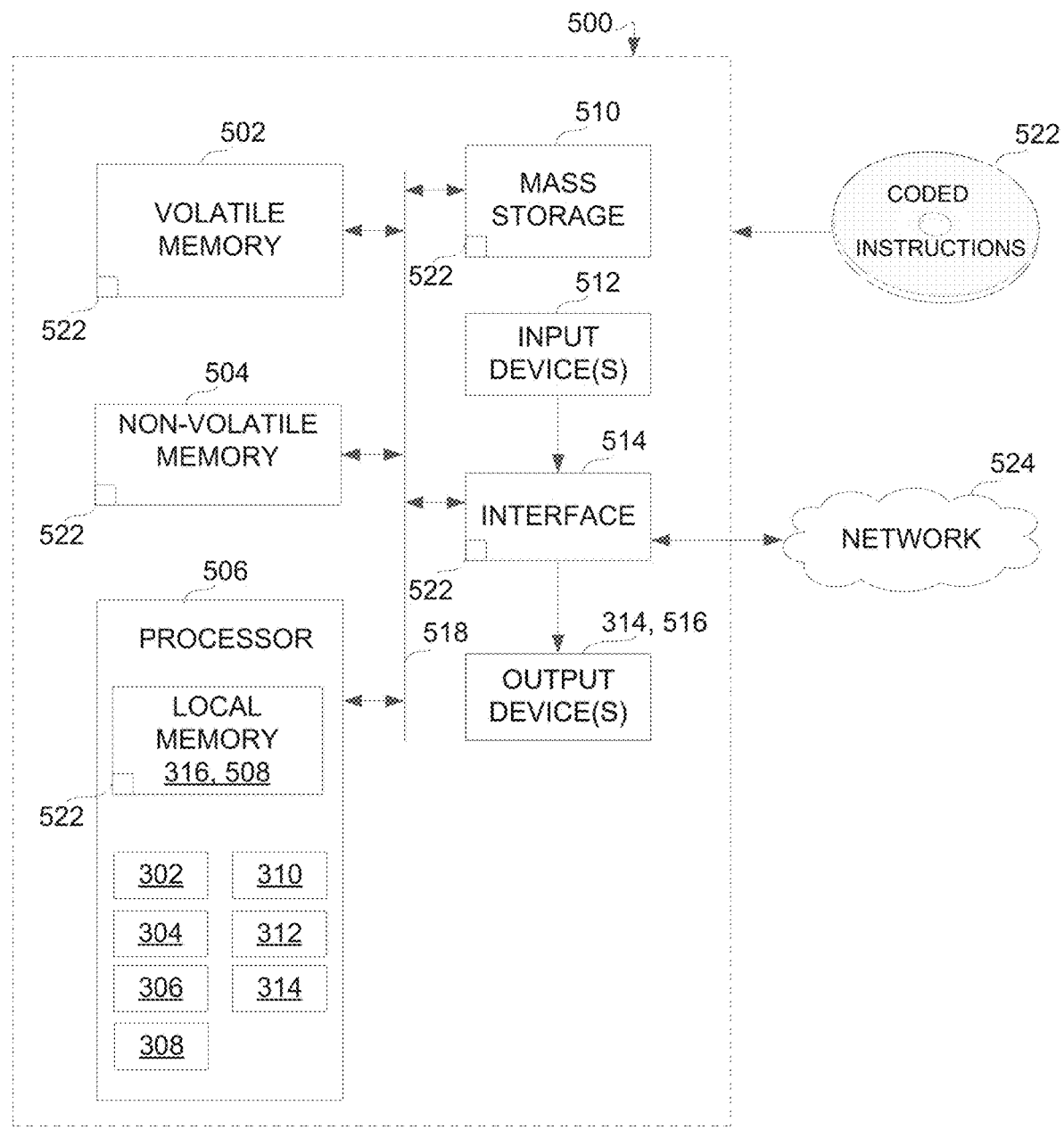
FIG. 5 is a block diagram of an example processing platform structured to execute the instructions of FIG. 4 to implement the example head-mounted display of FIG. 3.

FIG. 5 is a block diagram of an example processor platform 500 structured to execute the instructions of FIG. 4 to implement the apparatus of FIG. 3. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 506. The processor 506 of the illustrated example is hardware. For example, the processor 506 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 506 implements the receiver 302, the scanner 304, the calibrator 306, the clock 308, the analyzer 310, the selector 312, the display 314 (or a portion of display 314).

The processor of the illustrated example includes a local memory 316, 508 (e.g., a cache). The processor 506 of the illustrated example is in communication with a main memory including a volatile memory 502 and a non-volatile memory 504 via a bus 518. The volatile memory 502 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 504 may be implemented by flash memory and/or any other desired type of memory device. Access to the main memory 502, 504 is controlled by a memory controller.

The processor platform 500 of the illustrated example also includes an interface circuit 514. The interface circuit 514 may be implemented by any type of interface standard, such as an Ethernet interface, a universal serial bus (USB), a Bluetooth® interface, a near field communication (NFC) interface, and/or a PCI express interface.

In the illustrated example, one or more input devices 512 are connected to the interface circuit 514. The input device(s) 512 permit(s) a user to enter data and/or commands into the processor 506. The input device(s) 512 can be implemented by, for example, an audio sensor, a microphone, a camera (still or video), a keyboard, a button, a mouse, a touchscreen, a track-pad, a trackball, an isopoint device, and/or a voice recognition system.

One or more output devices 314, 516 are also connected to the interface circuit 514 of the illustrated example. The output devices 314, 516 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 514 of the illustrated example, thus, typically includes a graphics driver card, a graphics driver chip, and/or a graphics driver processor.

The interface circuit 514 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 524. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 510 for storing software and/or data. Examples of such mass storage devices 510 include floppy disk drives, hard drive disks, compact disk drives, Blu-ray disk drives, redundant array of independent disks (RAID) systems, and digital versatile disk (DVD) drives.

The machine executable instructions 522 of FIG. 5 may be stored in the interface circuit 514, the mass storage device 510, the processor's local memory 508, the volatile memory 502, the non-volatile memory 504, and/or on a removable non-transitory computer readable storage medium such as a CD or DVD.

From the foregoing, it will be appreciated that example systems, methods, apparatus, and articles of manufacture have been disclosed that utilize pupil size and location detection to permit adaptive display control in virtual reality environments. For example, display brightness levels are adjusted based on whether the pupil is dilated or constricted. The adaptive control of display characteristics in a virtual reality environment allows for a more customized and realistic user experience. Otherwise, the user experiences eye strain in the presence of a VR that has a static brightness level, or in some examples the adjustment method is not convenient, requiring adjustments from the console manually. The use of pupillary light reflex control enables the system to receive feedback form the user unconsciously, without any additional intervention required on the part of the user other than setting preferences for display characteristics against which the adjustments can take place.

In addition, examples disclosed herein operate on the head-mounted display side, as opposed to via interaction with a host. Thus, these examples continue to detect pupil location and size without having to receive instructions from the host. Thus, the examples disclosed here can continue to adaptively control display characteristics in the event that a wireless communication link breaks.

The disclosed methods, apparatus and articles of manufacture improve the efficiency of using a computing device by adaptively adjusting display characteristics based on physical changes with user physiology to enhance a user experience. The disclosed methods, apparatus and articles of manufacture are accordingly directed to one or more improvement(s) in the functioning of a computer and/or computing system.

In addition, the solutions disclosed herein help alleviate concerns that use of VR systems with HMDs exacerbates eye strain as a result of prolonged very close viewing distances associated with VR displays. The presence of an adaptive display control that responds to user feedback (the physiological changes the user experiences) allows for increased user comfort made possible by user-defined preferences for display settings, including brightness. In addition, in some examples disclosed herein, each eye is individually scanned and calibrated, such that both eye sizes are recorded. The customization of these examples to each eye allows users with uneven pupil sizes (anisocoria) and other variations in eye characteristics that vary from pupil to pupil, to experience the benefits and advantages of the technological improvements disclosed herein.

Disclosed herein are example systems, apparatus, articles of manufacture, and methods for adaptively adjusting display characteristics in virtual reality environments. Example 1 includes a virtual reality display device, the device includes a scanner to detect a first size of a pupil of an eye of a user. The device in Example 1 also includes an analyzer to determine a first characteristic of a display image and reference a second pupil size based on the first characteristic of the display image. The analyzer is also to compare the first pupil size and the second pupil size, and adjust a second characteristic of the display image when the second pupil size is different than the first pupil size. The device in Example 1 also includes a display screen to present the second characteristic.

Example 2 includes the device of Example 1, wherein the first characteristic is a color and the second characteristic is a brightness.

Example 3 includes the device in Example 1, further including a selector to receive a display image parameter selected by the user, the analyzer to determine the second characteristic of the display image based on the first size of the pupil and the user selected display image parameter.

Example 4 includes the device in Example 1, wherein the second characteristic is a display screen brightness, the analyzer to increase display screen brightness when the second size is smaller than the first size.

Example 5 includes the device in Example 1, wherein the second characteristic is a display screen brightness, the analyzer to decrease display screen brightness when the second size is larger than the first size.

Example 6 includes the device in Example 1, further including a calibrator to perform a calibration of pupil sizes to a plurality of colors, the analyzer to determine the second pupil size to reference based on the calibration.

Example 7 includes the device in Example 6, wherein the calibrator is to perform the calibration by setting a user selected brightness and correlating (a) the plurality of colors of the display image with the user selected brightness to (b) the plurality of pupil sizes detected during the presentation of respective colors of the plurality of colors.

Example 8 includes the device in Example 6, wherein the first characteristic is a color, the analyzer to identify an overall color of the display image, and the analyzer to identify the second pupil size to reference based on the overall color of the display image approximating a color in the calibration.

Example 9 includes the device in Example 1, wherein the display screen is to present video, the scanner to detect multiple changes in the first pupil size during presentation of the video, the analyzer to repeatedly adjust the second characteristic to change display screen brightness based on changes of the detected first pupil size.

Example 10 includes a virtual reality display device with means for detecting a first size of a pupil of an eye of a user, means for analyzing to determine a first characteristic of a display image, reference a second pupil size based on the first characteristic of the display image, compare the first pupil size and the second pupil size, and adjust a second characteristic of the display image when the second pupil size is different than the first pupil size. The device of Example 10 also includes means for presenting the second characteristic.

Example 11 includes the device of Example 10, wherein the first characteristic is a color and the second characteristic is a brightness.

Example 12 includes the device of Example 10, further including means for receiving a display image parameter selected by the user, wherein the means for analyzing is to determine the second characteristic of the display image based on the first size of the pupil and the user selected parameter.

Example 13 includes the device of Example 10, wherein the second characteristic is a display screen brightness, the means for analyzing is to increase display screen brightness when the second size is smaller than the first size.

Example 14 includes the device of Example 10, wherein the second characteristic is a display screen brightness, the means for analyzing is to decrease display brightness when the second size is larger than the first size.

Example 15 includes the device of Example 10, further means for performing a calibration of pupil sizes to a plurality of colors, the means for analyzing to determine the second pupil size to reference based on the calibration.

Example 16 includes the device of Example 15, wherein the means for performing a calibration is to set a user selected brightness, and correlate (a) the plurality of colors of the display image with the user selected brightness to (b) the plurality of pupil sizes detected during the presentation of respective colors of the plurality of colors.

Example 17 includes the device of Example 15, wherein the first characteristic is a color, the means for analyzing is to identify an overall color of the display, and identify the second pupil size to reference based on the overall color of the display image approximating a color in the calibration.

Example 18 includes the device of Example 10, wherein the display screen is to present video, the means for detecting a first size of a pupil is to detect multiple changes in the first pupil size during presentation of the video, the means for analyzing is to adjust the second characteristic to change display screen brightness based repeatedly based on changes of the detected first pupil size.

Example 19 includes a non-transitory computer readable storage medium comprising computer readable instructions that, when executed, cause one or more machines to, at least: access data of a first size of a pupil of an eye of a user, determine a first characteristic of a display image, reference a second pupil size based on the first characteristic of the display image, compare the first pupil size and the second pupil size, and adjust a second characteristic of the display image when the second pupil size is different than the first pupil size.

Example 20 includes the storage medium Example 19, wherein the first characteristic is a color and the second characteristic is a brightness.

Example 21 includes the storage medium Example 19, wherein the instructions further cause the one or more processors to access data of a display image parameter selected by the user, and determine the second characteristic of the display image based on the first size of the pupil and the user selected parameter.

Example 22 includes the storage medium Example 19, wherein the instructions further cause the one or more processors to increase display screen brightness when the second size is smaller than the first size.

Example 23 includes the storage medium Example 19, wherein the instructions further cause the one or more processors to decrease display screen brightness when the second size is larger than the first size.

Example 24 includes the storage medium Example 19, wherein the instructions further cause the one or more processors to perform a calibration of pupil sizes to a plurality of colors, and determine the second pupil size to reference based on the calibration.

Example 25 includes the storage medium Example 24, wherein the instructions further cause the one or more processors to perform a calibration by setting a user selected brightness, and correlating (a) the plurality of colors of the display image with the user selected brightness to (b) the plurality of pupil sizes detected during the presentation of respective colors of the plurality of colors.

Example 26 includes the storage medium Example 24, wherein the instructions further cause the one or more processors to identify an overall color of the display image, and identify the second pupil size to reference based on the overall color of the display image approximating a color in the calibration.

Example 27 includes the storage medium Example 19, wherein the instructions further cause the one or more processors to adjust the second characteristic to repeatedly change display screen brightness based on multiple changes of the detected first pupil size.

Example 28 includes a method to adjust display screen characteristics in a virtual reality display device, the method comprising: initiating an eye scanner to detect a first size of a pupil of an eye of a user; determining, by executing an instruction with a processor, a first characteristic of a display; referencing, by executing an instruction with the processor, a second pupil size based on the first characteristic of the display image. The method of Example 28 also includes comparing, by executing an instruction with the processor, the first pupil size and the second pupil size, and adjusting, by executing an instruction with the processor, a second characteristic of the display when the second pupil size is different than the first pupil size. The method of Example 28 also includes prompting a display screen to present the second characteristic.

Example 29 includes a method of Example 28, wherein the first characteristic is a color and the second characteristic is a brightness.

Example 30 includes a method of Example 28, further including receiving, by executing an instruction with the processor, a display parameter selected by the user. The method of Example 30 further includes determining, by executing an instruction with the processor, the second characteristic of the display based on the first size of the pupil and the user selected parameters.

Example 31 includes a method of Example 28, wherein the second characteristic is a display screen brightness, the method further including increasing display screen brightness, by executing an instruction with the processor, when the second size is smaller than the first size.

Example 32 includes a method of Example 28, wherein the second characteristic is a display screen brightness, the method further including decreasing display screen brightness, by executing an instruction with the processor, when the second size is larger than the first size.

Example 33 includes a method of Example 28, further including performing, by executing an instruction with the processor, a calibration of pupil sizes to a plurality of colors. The Example 33 includes determining, by executing an instruction with the processor, the second pupil size to reference based on the calibration.

Example 34 includes a method of Example 33, wherein performing the calibration includes setting a user selected brightness, and correlating (a) the plurality of colors of the display image with the user selected brightness to (b) the plurality of pupil sizes detected during the presentation of respective colors of the plurality of colors.

Example 35 includes a method of Example 33, wherein the first characteristic is a color, the method further including identifying, by executing an instruction with the processor, an overall color of the display image; and identifying, by executing an instruction with the processor, the second pupil size to reference based on the overall color of the display image approximating a color in the calibration.

Example 36 includes a method of Example 28, further including adjusting, by executing an instruction with the processor, the second characteristic repeatedly to change display screen brightness based on multiple changes of the detected first pupil size.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A virtual reality display device comprising:
    a scanner to detect a pupil of an eye of a user;
    an analyzer to:
        determine a first characteristic of a display image;
        assess a size of the pupil using periodic sampling until the pupil is adjusted to the display image, the size of the pupil when adjusted being a first pupil size;
        reference a calibration of pupil sizes to a plurality of the first characteristics of the display image;
        identify a second pupil size correlated with one of the plurality of the first characteristics substantially equal to the first characteristic of the display image;
        compare the first pupil size and the second pupil size; and
        adjust a second characteristic of the display image when the second pupil size is different than the first pupil size; and
    a display screen to present the second characteristic.

2. A device as defined in claim 1, wherein the first characteristic is a color and the second characteristic is a brightness.

3. A device as defined in claim 1, further including a selector to receive a display image parameter selected by the user, wherein the analyzer is to determine the second characteristic of the display image based on the first size of the pupil and the user selected display image parameter.

4. A device as defined in claim 1, wherein the second characteristic is a display screen brightness, the analyzer to increase display screen brightness when the second size is smaller than the first size.

5. A device as defined in claim 1, wherein the second characteristic is a display screen brightness, the analyzer to decrease display screen brightness when the second size is larger than the first size.

6. A device as defined in claim 1, further including a calibrator to perform the calibration of pupil sizes to a plurality of colors, the analyzer to determine the second pupil size to reference based on the calibration.

7. A device as defined in claim 6, wherein the calibrator is to perform the calibration by:
setting a user selected brightness; and
correlating (a) the plurality of colors of the display image with the user selected brightness to (b) the plurality of pupil sizes detected during a presentation of respective colors of the plurality of colors.

8. A device as defined in claim 6, wherein the first characteristic is a color, the analyzer to:
identify an overall color of the display image, and
identify the second pupil size to reference based on the overall color of the display image approximating a color in the calibration.

9. A device as defined in claim 1, wherein the display screen is to present video, the scanner to detect multiple changes in the first pupil size during presentation of the video, the analyzer to repeatedly adjust the second characteristic to change display screen brightness based on changes of the detected first pupil size.

10. A virtual reality display device comprising:
means for detecting a pupil of an eye of a user;
means for analyzing to:
determine a first characteristic of a display image;
assess a size of the pupil using periodic sampling until the pupil is adjusted to the display image, the size of the pupil when adjusted being a first pupil size;
reference a calibration of pupil sizes to a plurality of the first characteristics of the display image;
identify a second pupil size correlated with one of the plurality of the first characteristics substantially equal to the first characteristic of the display image;
compare the first pupil size and the second pupil size; and
adjust a second characteristic of the display image when the second pupil size is different than the first pupil size, the second characteristic a different type of characteristic than the first characteristic; and
means for presenting the second characteristic.

11. A device as defined in claim 10, wherein the first characteristic is a color and the second characteristic is a brightness.

12. A device as defined in claim 10, further including means for receiving a display image parameter selected by the user, wherein the means for analyzing is to determine the second characteristic of the display image based on the first size of the pupil and the user selected parameter.

13. A device as defined in claim 10, wherein the second characteristic is a display screen brightness, the means for analyzing is to increase display screen brightness when the second size is smaller than the first size.

14. A device as defined in claim 10, wherein the second characteristic is a display screen brightness, the means for analyzing is to decrease display screen brightness when the second size is larger than the first size.

15. A device as defined in claim 10, further including means for performing the calibration of pupil sizes to a plurality of colors, the means for analyzing to determine the second pupil size to reference based on the calibration.

16. A device as defined in claim 15, wherein the means for performing a calibration is to:
set a user selected brightness; and
correlate (a) the plurality of colors of the display image with the user selected brightness to (b) the plurality of pupil sizes detected during a presentation of respective colors of the plurality of colors.

17. A device as defined in claim 15, wherein the first characteristic is a color, the means for analyzing is to identify an overall color of the display image, and identify the second pupil size to reference based on the overall color of the display image approximating a color in the calibration.

18. A device as defined in claim 10, wherein the display screen is to present video, the means for detecting a first size of a pupil is to detect multiple changes in the first pupil size during presentation of the video, the means for analyzing to change display screen brightness based repeatedly based on changes of the detected first pupil size.

19. A non-transitory computer readable storage medium comprising computer readable instructions that, when executed, cause one or more processors to, at least:
access data of a size of a pupil of an eye of a user;
determine a first characteristic of a display image;
assess the size of the pupil using periodic sampling until the pupil is adjusted to the display image, the size of the pupil when adjusted being a first pupil size;
reference a calibration of pupil sizes to a plurality of the first characteristics of the display image;
identify a second pupil size correlated with one of the plurality of the first characteristics substantially equal to the first characteristic of the display image;
compare the first pupil size and the second pupil size; and
adjust a second characteristic of the display image when the second pupil size is different than the first pupil size, the second characteristic a different type of characteristic than the first characteristic.

20. The storage medium of claim 19, wherein the instructions further cause the one or more processors to:
access data of a display image parameter selected by the user; and
determine the second characteristic of the display image based on the first size of the pupil and the user selected parameter.

21. The storage medium of claim 19, wherein the instructions further cause the one or more processors to increase display screen brightness when the second size is smaller than the first size.

22. The storage medium of claim 19, wherein the instructions further cause the one or more processors to decrease display screen brightness when the second size is larger than the first size.

23. The storage medium of claim 19, wherein the instructions further cause the one or more processors to:
perform the calibration of pupil sizes to a plurality of colors; and
determine the second pupil size to reference based on the calibration.

24. The storage medium of claim 23, wherein the instructions further cause the one or more processors to:

perform the calibration by:
    setting a user selected brightness; and
    correlating (a) the plurality of colors of the display image with the user selected brightness to (b) the plurality of pupil sizes detected during a presentation of respective colors of the plurality of colors.

25. The storage medium of claim 23, wherein the instructions further cause the one or more processors to:
    identify an overall color of the display image; and
    identify the second pupil size to reference based on the overall color of the display image approximating a color in the calibration.

* * * * *